(12) United States Patent
Mann et al.

(10) Patent No.: US 8,764,028 B2
(45) Date of Patent: Jul. 1, 2014

(54) STAIR CLIMBING WHEEL WITH MULTIPLE CONFIGURATIONS

(76) Inventors: Kevin Mann, Juneau, AK (US); Will Klatt, Eagle River, AK (US); Nick Barnes, Kenai, AK (US)

( * ) Notice: Subject to any disclaimer, the term of this patent is extended or adjusted under 35 U.S.C. 154(b) by 775 days.

(21) Appl. No.: 12/955,069

(22) Filed: Nov. 29, 2010

(65) Prior Publication Data

US 2011/0127732 A1 Jun. 2, 2011

Related U.S. Application Data

(60) Provisional application No. 61/265,008, filed on Nov. 30, 2009.

(51) Int. Cl.
*B62D 57/00* (2006.01)
*B62D 51/06* (2006.01)

(52) U.S. Cl.
USPC ........... 280/5.28; 280/5.26; 180/8.2; 180/8.3; 301/45

(58) Field of Classification Search
USPC ........ 280/5.28, 5.26; 301/48–51; 180/8.2, 8.3
See application file for complete search history.

(56) References Cited

U.S. PATENT DOCUMENTS

| | | | | |
|---|---|---|---|---|
| 210,492 A * | 12/1878 | Broja | | 180/8.7 |
| 1,158,263 A * | 10/1915 | Nettle | | 152/291 |
| 1,201,315 A * | 10/1916 | Leinberger | | 301/48 |
| 1,450,626 A * | 4/1923 | Atwood | | 301/46 |
| 1,816,300 A * | 7/1931 | Stokes et al. | | 301/50 |
| 2,007,853 A * | 7/1935 | Fuss | | 301/46 |
| 2,488,831 A * | 11/1949 | Rohan | | 301/51 |
| 3,016,270 A * | 1/1962 | Tucker, Sr. | | 301/48 |
| 3,178,193 A * | 4/1965 | Grogan | | 280/5.26 |
| 3,499,501 A * | 3/1970 | Bauer et al. | | 180/8.2 |
| 3,515,401 A | 6/1970 | Gross | | |
| 4,142,732 A * | 3/1979 | Boyd | | 280/5.26 |
| 4,312,417 A * | 1/1982 | Dalton et al. | | 180/8.2 |
| 4,674,757 A | 6/1987 | Martin | | |
| 5,303,992 A * | 4/1994 | Grainger | | 305/46 |
| 6,357,765 B1 * | 3/2002 | Heien | | 280/5.26 |
| 6,431,664 B1 | 8/2002 | Sawada | | |
| 7,380,618 B2 * | 6/2008 | Gunderson et al. | | 180/8.2 |
| 7,503,567 B2 * | 3/2009 | Frankie | | 280/5.2 |
| 7,806,208 B2 * | 10/2010 | Gunderson et al. | | 180/8.2 |
| 2006/0185911 A1 * | 8/2006 | Gunderson et al. | | 180/8.3 |

* cited by examiner

*Primary Examiner* — Kevin Hurley
(74) *Attorney, Agent, or Firm* — Milbank, Tweed, Hadley & McCloy LLP

(57) ABSTRACT

A stair climbing wheel and vehicles are described. The stair climbing wheel has a rolling wheel and a plurality of deployable protrusions that allow the wheel to climb stairs. The deployable protrusions can be deployed from or retracted into the rolling wheel. In the retracted position, the stair climbing wheel functions as a traditional circular wheel. These stair climbing wheels can be incorporated on a wide variety of vehicles, such as hand trucks, wheelchairs, and personal transports to allow these vehicles to climb stairs.

2 Claims, 7 Drawing Sheets

STAIR CLIMBING WHEEL WITH MULTIPLE CONFIGURATIONS

This application claims priority to U.S. Provisional Application Ser. No. 61/265,008, filed on Nov. 30, 2009, the disclosure of which is incorporated by reference herein in its entirety.

FIELD OF INVENTION

This invention relates to stair climbing wheels and vehicles.

BACKGROUND OF INVENTION

The wheel may be the most important mechanical invention of all time. However, the wheel suffers some disadvantages because it is only optimized for use on level surfaces. Climbing stairs or negotiating bumpy terrain with a wheel(s) induces large shocks or accelerations and/or may require significantly more force or torque to accomplish compared to travelling over substantially flat terrain.

Attempts have been made to address stair climbing problems associated with conventional circular wheels by replacing the conventional wheel with some other arrangement. For example, three smaller circular wheels have been mounted in a generally triangular shape. This configuration suffers the distinct disadvantage of being difficult to turn on level ground.

BRIEF DESCRIPTION OF THE INVENTION

In one embodiment, a stair climbing wheel is described. The wheel comprises a rolling wheel and a plurality of deployable protrusions retractably disposed around the periphery of the rolling wheel; wherein the stair climbing wheel has a level configuration for use on relatively level surfaces wherein the plurality of deployable protrusions are retracted inside the rolling wheel; and wherein the stair climbing wheel has a climbing configuration for use on stairs wherein a number of the plurality of deployable protrusions extend beyond the outer diameter of the rolling wheel. The deployable protrusions can be arranged in different configurations, for example, three of them arranged at about 120 degrees separation from each other or four of them at about 90 degrees separation from each other. The stair climbing wheel may have a user-selectable deployment actuator for extending and retracting the deployable protrusions. In one embodiment, this is done automatically. The stair climbing wheel may be sized in relation to typical stair sizes. In one embodiment, the stair climbing wheel may be connected to another stair climbing wheel by an axle. This axle may optionally be driven by a motor.

In another embodiment, a hand truck is described, comprising a cargo ledge for transporting objects, a handle for pushing or pulling the hand truck, and one or more of stair climbing wheels as described above.

In other embodiments, the stair climbing wheels can be incorporated on wheelchairs, personal transport devices, or any other device for which transport up stairs may be required.

DETAILED DESCRIPTION OF THE INVENTION

Disclosed herein is a stair climbing wheel and stair climbing vehicles. The wheels of the present invention are configured for travelling on both level surfaces and up or down stairs or unlevel terrain.

Figure 1:
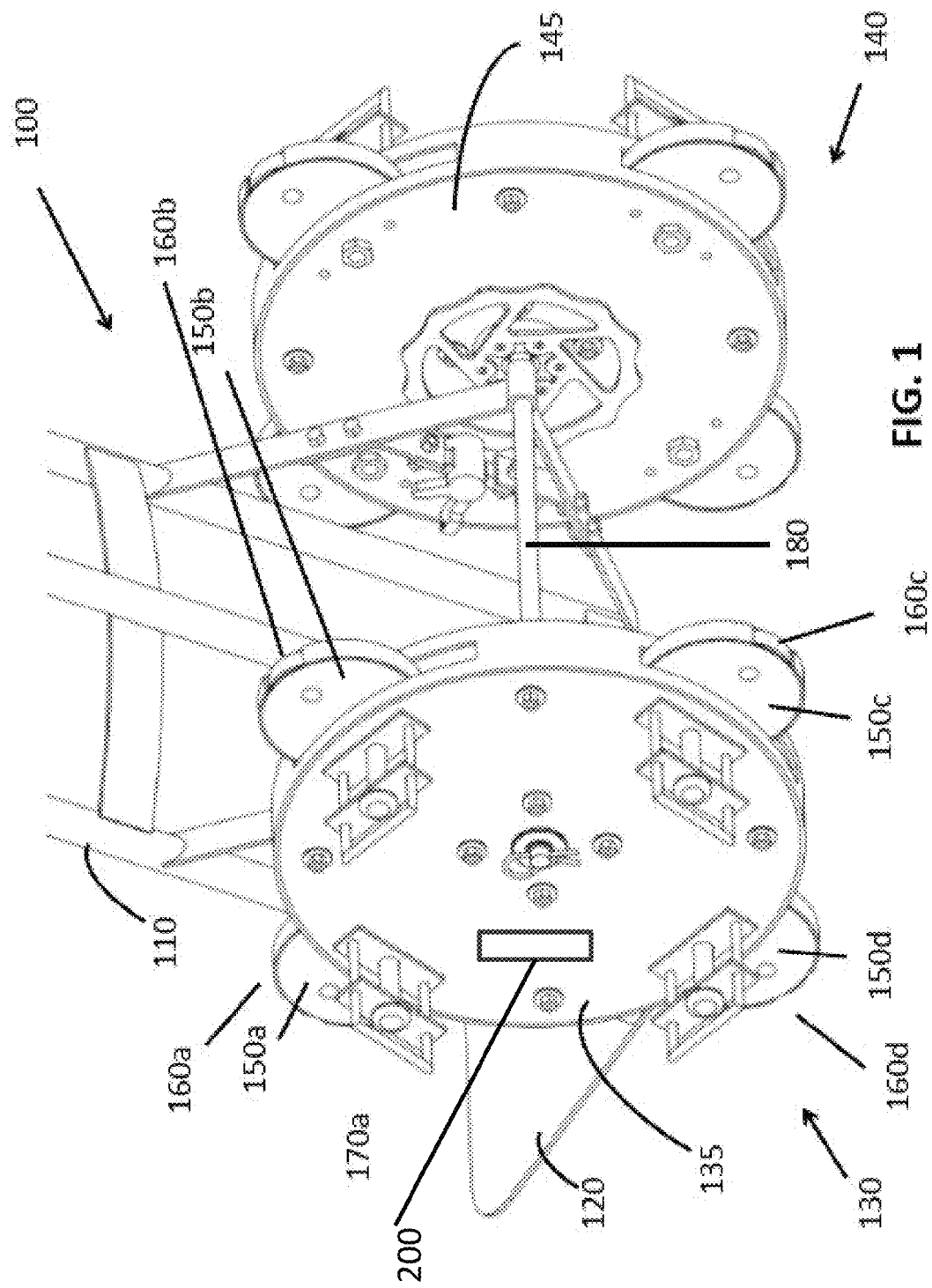
FIG. 1 shows an embodiment of a hand truck having stair climbing wheels.

In one embodiment, stair climbing wheels can be implemented on a hand truck or dolly. A hand truck, which may also be referred to as a dolly, a stack truck, a trolley, a sack truck, or a bag barrow, is generally an L-shaped cargo moving handcart with handles at one end, wheels at the base, and a cargo ledge to set objects or cargo on. In one embodiment, hand truck 100 is generally shown in FIG. 1. Hand truck 100 comprises a handle 110 and a cargo ledge 120. In the illustrated embodiment, handle 110 is shown as generally vertical while cargo ledge 120 is shown as generally horizontal, by way of example although not required. A pair of stair climbing wheels 130, 140 are shown on either side of hand truck 100. In the illustrated embodiment, each of these stair climbing wheels 130 and 140 is identical, by way of example although not required. Stair climbing wheels 130, 140 comprise rolling wheels 135 and 145. In one embodiment, each rolling wheel 135, 145 is able to rotate independently of the other. In the illustrated embodiment, rolling wheels 135, 145 are operatively connected to one another by axle 180, thereby causing both rolling wheels 135, 145 to rotate synchronously.

In the illustrated embodiment, the stair climbing wheels 130, 140 are identical. Attention is now focused on stair climbing wheel 130. Rolling wheel 135 has four deployable protrusions 150a, 150b, 150c, 150d retractably disposed around its periphery. In the illustrated embodiment, the deployable protrusions are depicted as circular by way of example. In other embodiments (not shown) the protrusions can be ellipsoids or other shapes. In the illustrated embodiment, the deployable protrusions are disposed at about 90 degrees from adjacent protrusions. This configuration is shown by way of example although not required. In other embodiments (not shown), a rolling wheel has a different number and arrangement of deployable protrusions, for example, three protrusions arranged at about 120 degrees, two protrusions arranged at about 180 degrees, five protrusions arranged at about 72 degrees, six protrusions arranged at about 60 degrees, and so on.

In one embodiment, deployable protrusions rotate. In the illustrated embodiment of FIG. 1, the deployable protrusions 150a, 150b, 150c, 150d do not rotate when they are in the climbing configuration. Stair climbing wheel 130 has two configurations: a "climbing configuration," and a "level configuration." The climbing configuration of the illustrated embodiment is shown in FIG. 1, wherein a number of (in the illustrated example, four) deployable protrusions (150a, 150b, 150c, 150d) extend beyond the outer diameter of the associated rolling wheel 135. In the level configuration (not shown), all of the deployable protrusions are retracted inside of the associated rolling wheel, 135. In the level configuration, the rolling wheel 135 contacts the floor or other surface along its outer diameter, and the rolling motion is not interfered with by the (now retracted) deployable protrusions.

In the illustrated embodiment, each deployable protrusion 150a, 150b, 150c, 150d has its own deployment actuator 170a, 170b, 170c, 170d. In another embodiment (not shown) a single deployment actuator can actuate multiple deployable protrusions, for example, it can actuate all of the deployable protrusions on one or more stair climbing wheels. In one embodiment, deployment actuators 170a, 170b, 170c, 170d are manual actuators. For example, the user grasps the actuator, pulls it out, and rotates it to deploy the deployable protrusion. In another embodiments, the actuator can be electrical, pneumatic, hydraulic, motorized, or the like. In the latter embodiments, the user can energize the actuator by simply pressing a button (not shown) or flipping a switch (not shown) on handle 110 to almost effortlessly deploy protrusions 150a, 150b, 150c, 150d. As will be discussed later, the sizing and arrangement of the rolling wheel 135 and deployable protrusions 150 may be designed in relation to a typical rise and run of stairs. Therefore, in some embodiments it is contemplated that a user can select only a portion of, or all of, the deployable protrusions to deploy to the climbing configuration based on the rise and run of stairs. For example smaller stairs may require more protrusions to be deployed, while larger stairs may require fewer protrusions to be deployed.

The embodiment shown in FIG. 1 includes adjustment wheels 160a, 160b, 160c, 160d disposed on the outer periphery of deployable protrusions 150a, 150b, 150c, and 150d. The adjustment wheels can rotate to assist the operator in lining up hand truck 100 with stairs before climbing the stairs.

Hand truck 100 also may include brakes operatively attached to axle 180. A user can actuate the brakes by way of handbrakes, in a manner akin to brakes as implemented on bicycles. In this way the user can brake both stair climbing wheels 130, 140 by selecting either one or both handbrakes. In another embodiment (not shown), the wheels rotate independently of one another and each wheel has its own brake/handbrake. Therefore, a user can selectively brake either one of the wheels or both of the wheels depending on which handbrake is operated. It is to be understood that any number of breaking mechanisms known to those of skill in the art may be employed.

In one embodiment, hand truck 100 has a motor (not shown) operatively connected to axle 180 to produce torque to drive the axle 180. A user can operate the motor by controls (not shown), mounted for example on handle 110. The motor can be useful for example, for transporting heavier loads.

In one embodiment, hand truck 100 includes one or more shock absorbers (not shown). Shock absorbers, known in the art are useful to minimize shocks and accelerations. This is particularly desirable, for example, for transporting fragile or expensive cargo.

Attention is now turned to the use of hand truck 100. The cargo ledge 120 may be generally flat on the floor when the hand truck 100 is upright. The operator uses handles 110 to tilt hand truck 100 forward and the cargo ledge 120 is inserted underneath the object(s) or cargo to be transported. Then handtruck 100 is tilted backward until the weight is balanced over the wheels 130, 140, making the otherwise bulky and heavy cargo easier to move. This type of arrangement is an example of a first class lever, or a lever in which the fulcrum is located between the input force and the output load. In operation, a force is applied by pulling or pushing handles 110, which causes the cargo ledge 120 to swing about the fulcrum, which in this case is generally located near the axle 180. At this point, the user can pull or push handle 110 in order to transport the cargo. If operating on a level surface, it is desirable to use hand truck 100 in the level configuration wherein the deployable protrusions 150 are retracted inside of rolling wheels 135, 145.

Figure 2:
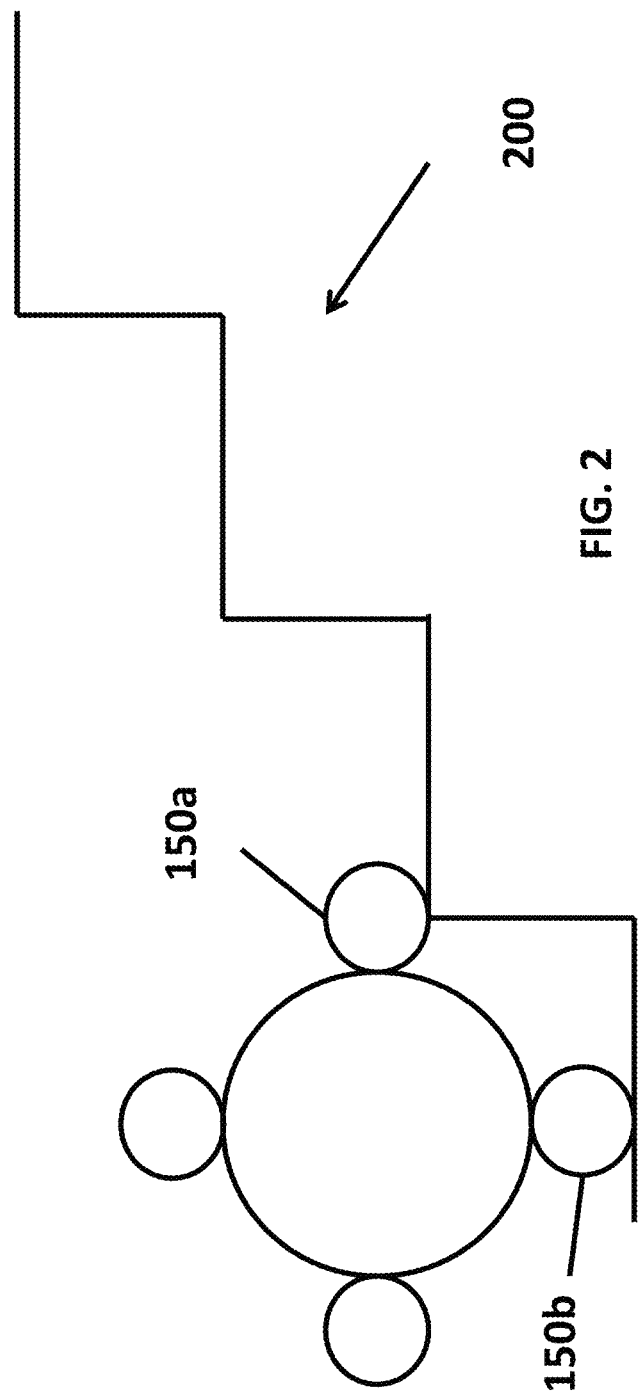
FIGS. 2-4 schematically depict an embodiment of a stair climbing wheel.

To transport cargo up or down stairs the user first positions hand truck 100 near stairs 200 as shown in FIG. 2. Deployment actuators 170 actuate deployable protrusions 150 to the climbing configuration as shown in FIG. 1. Hand truck 100 can be further positioned using adjustment wheels 160 even when in the climbing configuration. Preferably, the user aligns one of the deployable protrusions 150a to be flush with the horizontal portion of the bottom stair as shown in FIG. 2. In this position, another of deployable protrusions 150b rests on the floor. In one embodiment, this is accomplished by manipulating hand truck 100 by way of adjustment wheels 160 (shown in FIG. 1). A user can optionally engage the handbrakes while utilizing adjustment wheels.

Figure 3:
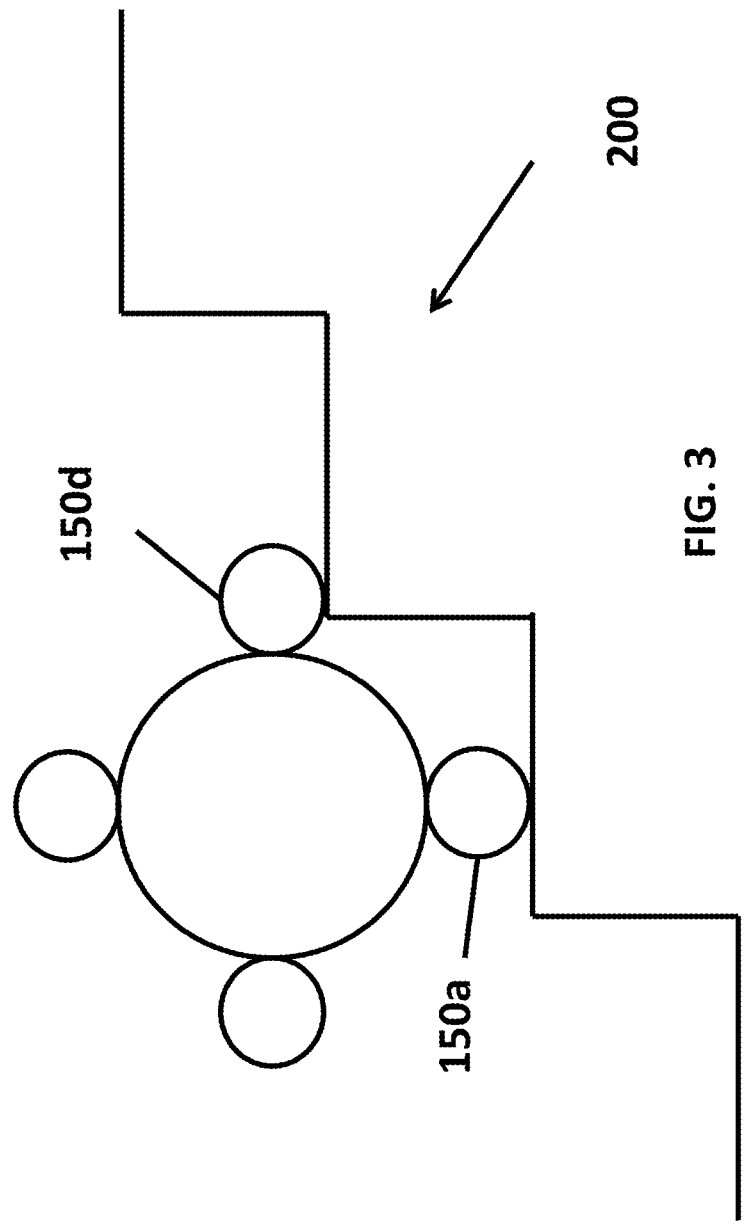
Figure 4:
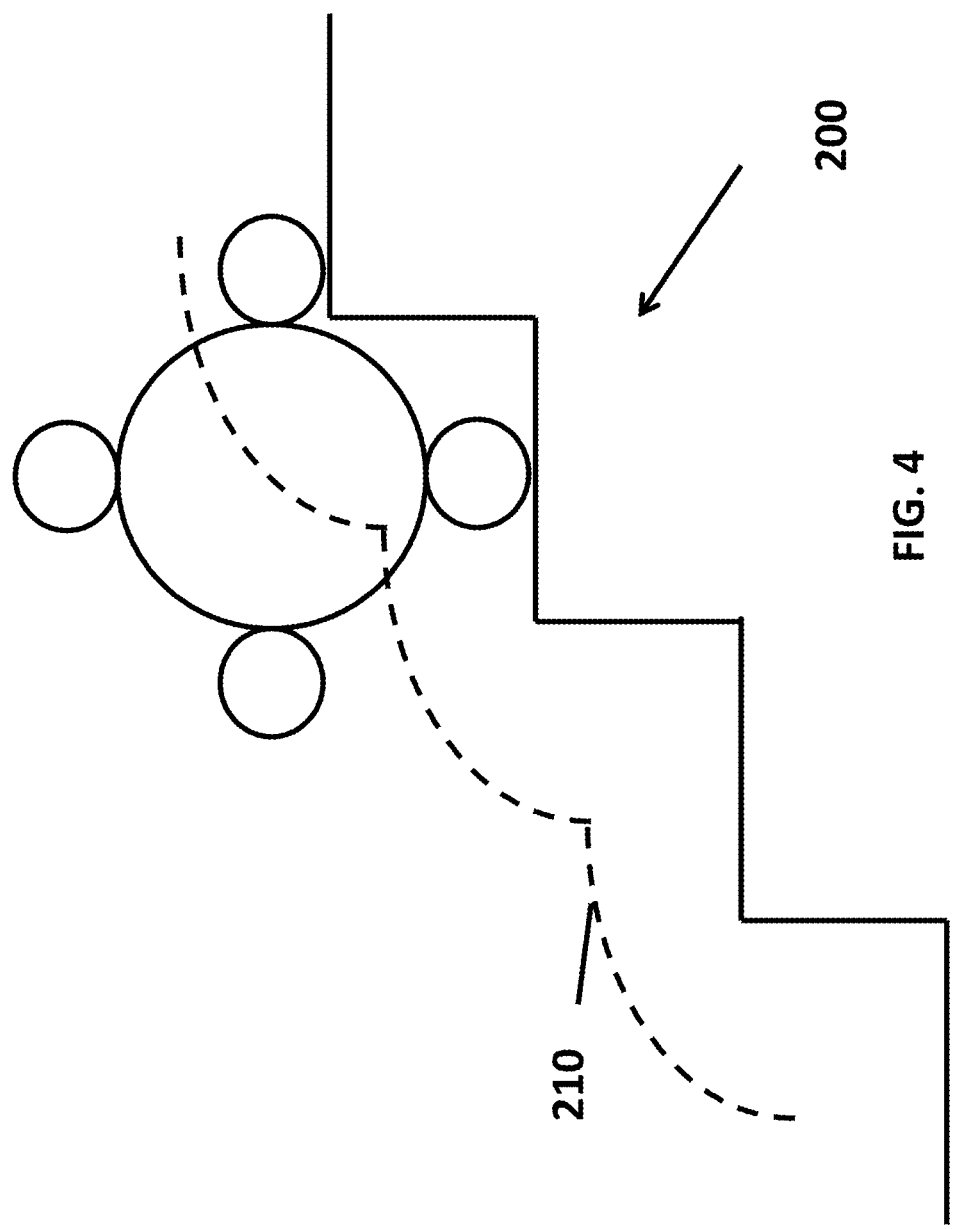

The deployable protrusion 150a resting on the first step will act as a lever about which hand truck 100 rotates over the first step as shown in FIG. 2. In the illustrated embodiment, after 90 degrees of travel, another deployable protrusion 150d comes into contact with the second step, as shown in FIG. 3. The process can be repeated until the load is at the top of the steps. The motion of the centroid of the wheel is schematically shown as dashed line 210 in FIG. 4. It is noted that this motion is significantly smoother than would be generated if the rolling wheel had to traverse the steps without the aid of deployable protrusions, as the user would have to laboriously lug the rolling wheel up and over the cusp of each step. This requires more force (or torque), and also causes an acceleration spike as each step is negotiated. This is undesirable because fragile cargo, for example, electronics, breakables, groceries, and the like can be damaged or destroyed during this process. In stark contrast, the present invention minimizes the force and torque required to climb stairs, as well as minimizing acceleration spikes. In contrast to a circular wheel, the climbing configuration of the present invention causes the axle to move in closer to a linear fashion.

Once at the top of the stairs, hand truck 100 can be put back into the level configuration so that the load can be easily moved along the level surface at the top of the steps. This can easily be accomplished by using deployment actuators 170 to retract the deployable protrusions 150 back into their respective rolling wheels 135, 145. Then the user can once again enjoy all the benefits of a conventional hand truck now that the stair climbing capability is no longer needed. Moreover, the transition to the level configuration does not require significant additional complex, heavy (and/or costly) equipment. This is because the deployable protrusions merely retract into the preexisting rolling wheel, which is already in place on the axle. In one embodiment, a sensor may optionally be deployed to permit automatic switching to a level configuration.

Figure 5:
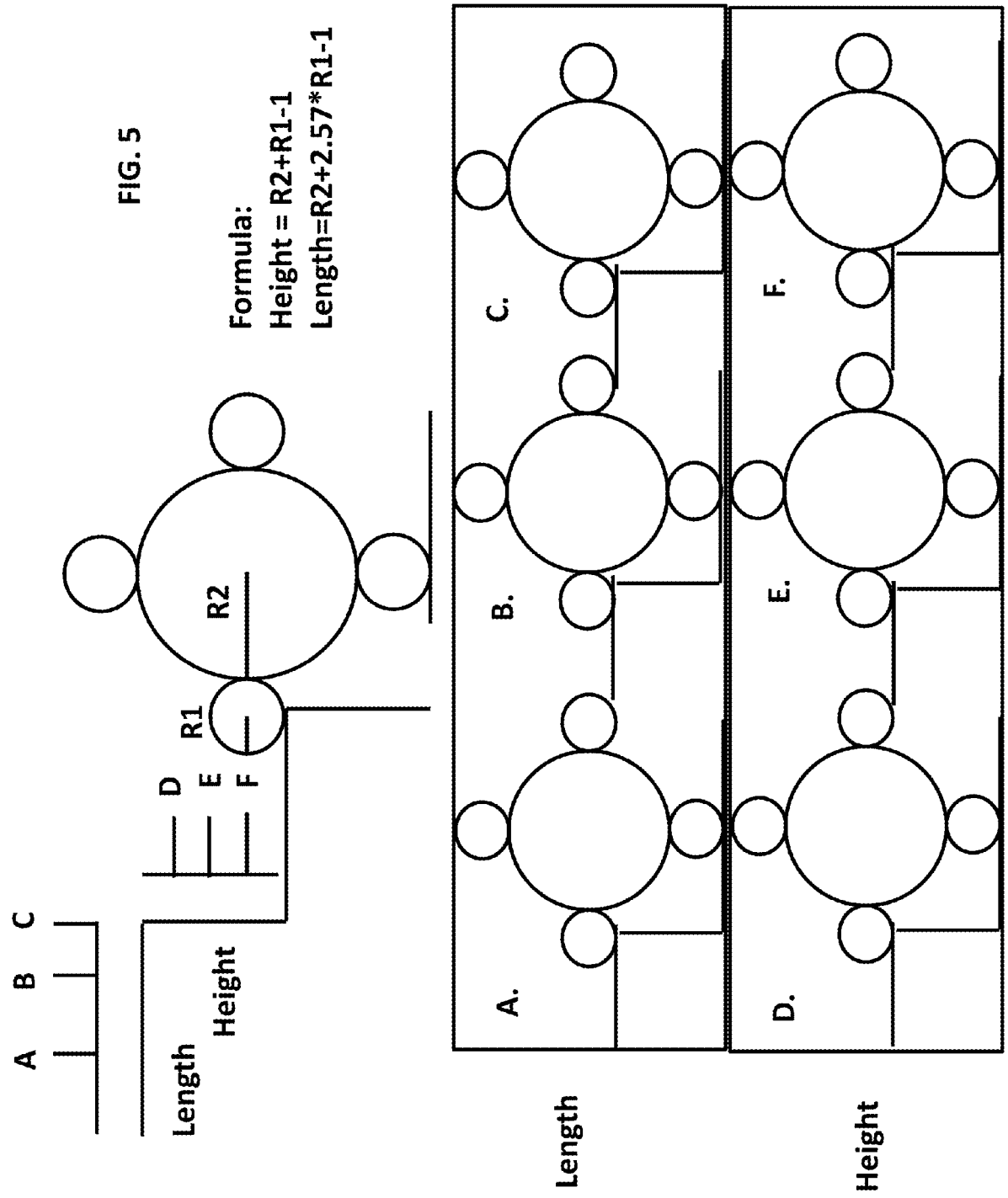
FIG. 5 depicts equations for sizing stair climbing wheels according to one embodiment of the invention.

Most stairs have about the same rises (vertical portion of each step) and runs (horizontal portion of each step). The stair climbing wheels of the instant invention can be sized in relation to typical rises and runs, for example in relation to the average or medians of these values. An example of such sizing is shown in FIG. 5. The diameter of a deployable protrusion 150 is designated as $R_1$, while the diameter of the rolling wheel 135 is designated as $R_2$. In one embodiment, the relationship between $R_1$, $R_2$, and the run of the step is run=$R_2$+$(1+\pi/2)R_1-1$, where "1" represents the amount that the deployable protrusion 150 is housed within the rolling wheel 135 in the climbing configuration. In one embodiment, the relationship between $R_1$, $R_2$, and the rise of the step is rise=$R_1+R_2-1$, where "1" in this equation is as given above. When the four deployable protrusion configuration shown in FIG. 5 is sized according to these equations, the deployable protrusion at the "9 o'clock" position (travelling from right to left as shown in FIG. 5) will rest on the next highest step as the wheel travels up the stairs. As the rolling wheel rotates 90 degrees, the successive deployable protrusion will rest on the second step, and so on. The invention will still operate on steps that are not exactly the median as sized above. In these "off design" stairs, the successive deployable protrusions may not be at exactly the 9 o'clock position as they first encounter the next highest step, but this will not stop the stair climbing wheel from functioning. As noted previously, in one embodiment, the user elects to employ all or less than all of the protrusions based on step sizing.

Figure 6:
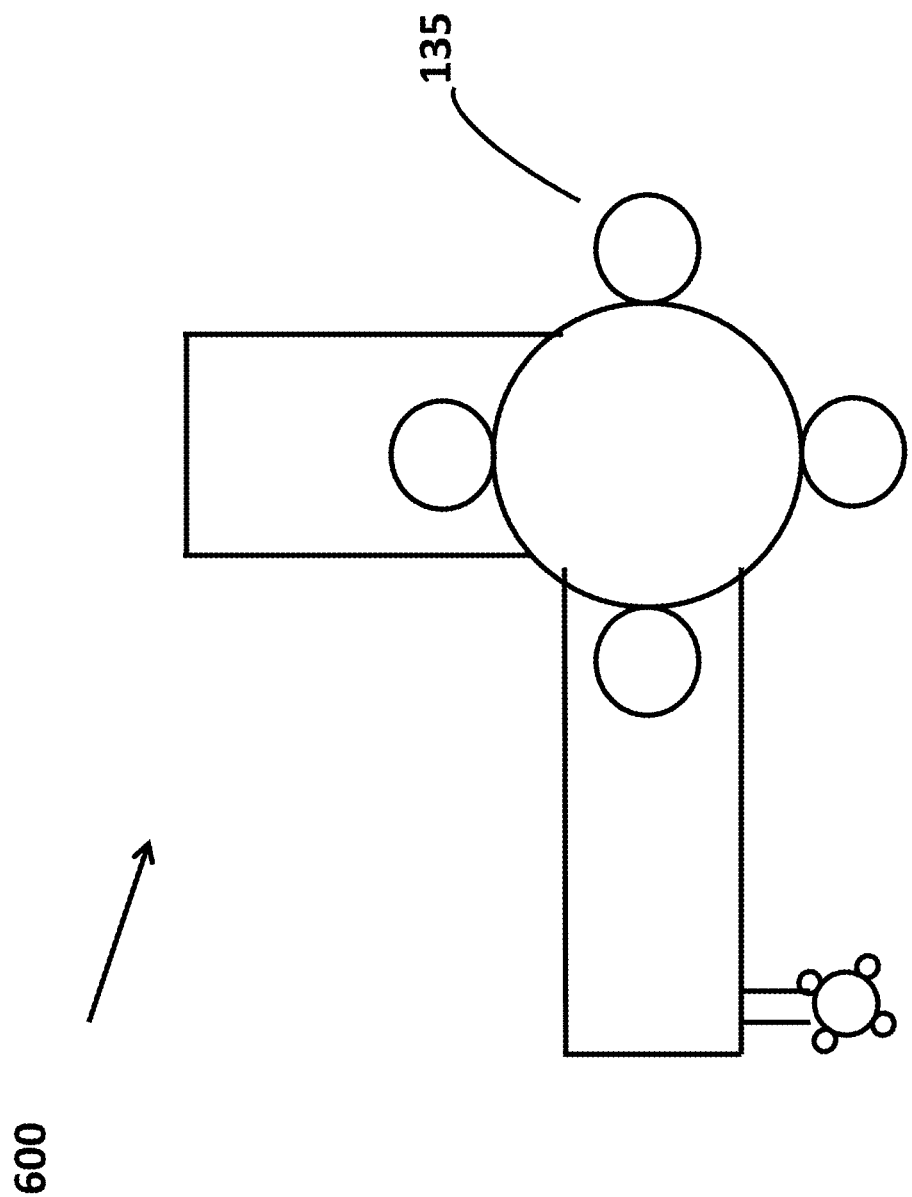
FIG. 6 depicts an embodiment of a stair climbing wheelchair.

The invention is not limited to hand trucks. Stair climbing wheels of the present invention are suitable for use in various configurations and can operate in systems incorporating only one such wheel, two such wheels (for example in the illustrated hand truck implementation), three such wheels (a tricycle type configuration), four such wheels, and so on. Furthermore, stair climbing wheels of the present invention can be used on a wide variety of vehicles or implementations. In one embodiment, the stair climbing wheels of the present invention can be incorporated on a wheelchair 600 as shown in FIG. 6. This is desirable to allow the user to climb stairs which would otherwise present an insurmountable obstacle. In a wheelchair implementation, a motor is operatively connected to the stair climbing wheels to provide the necessary torque to successfully climb stairs.

Figure 7:
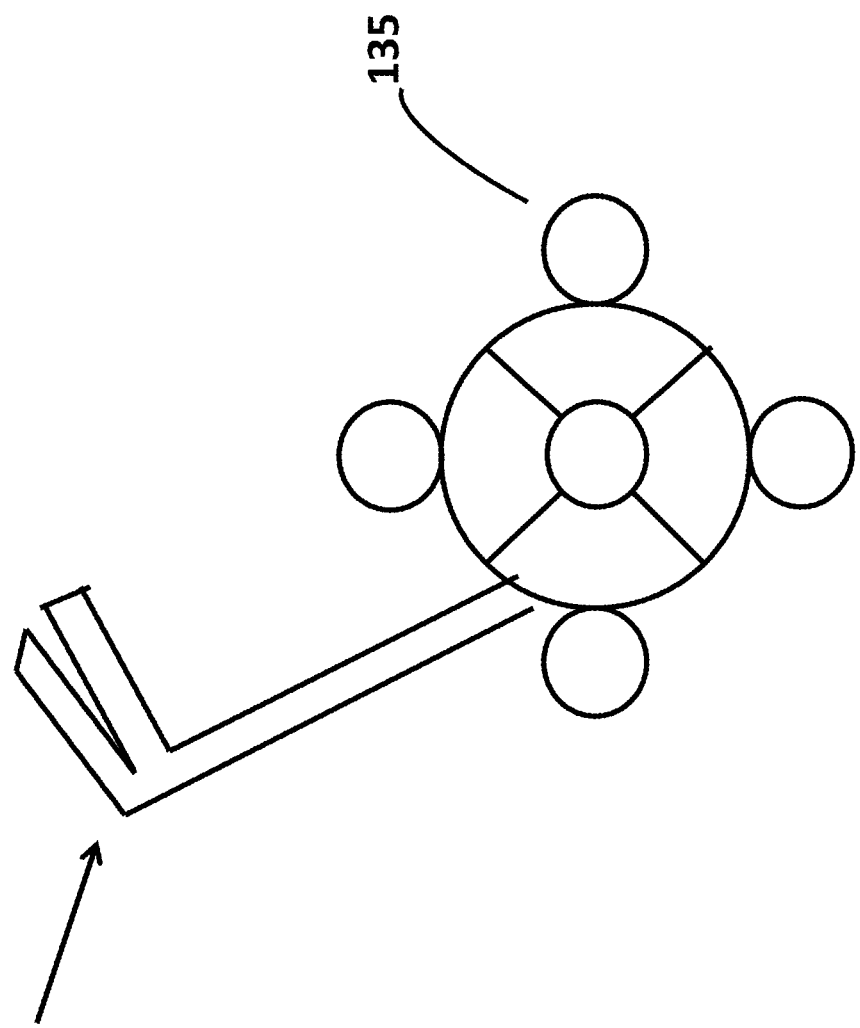
FIG. 7 depicts an embodiment of a stair climbing personal transport.

In another embodiment, stair climbing wheels of the present invention are incorporated on a personal transport 700, for example on a Segway® personal transport as shown in FIG. 7. Currently, personal transports are limited to relatively flat terrain. Riders cannot negotiate stairs, and must either find a ramp, which is not available in many places, or else dismount the personal transport and proceed on foot. Incorporating the stair climbing wheels of the present invention allow the personal transport 700 to go where it could not go before. The rider simply commands the deployable protrusions to actuate, which puts the stair climbing wheels into the climbing configuration.

Stair climbing wheels of the present invention are suitable for any vehicle, for example but not limited to, unmanned vehicles, remote control vehicles, cars, trucks, bicycles, tricycles and so on.

The present invention can be fabricated from a wide variety of materials. The rolling wheels 135, 145, can be, for example inflatable tires. In another embodiment, the rolling wheels can be made of molded plastic, rubber, metals, ceramics and the like. The deployable protrusions can also be fabricated from a wide variety of materials, for example but not limited to molded plastic, rubber, metals, ceramics and the like.

We claim:

1. A stair climbing wheel comprising a rolling wheel and a plurality of deployable protrusions retractably disposed around the periphery of the rolling wheel, further comprising an adjustment wheel disposed on the periphery of each of said plurality of deployable protrusions; wherein said stair climbing wheel has a level configuration for use on relatively level surfaces wherein said plurality of deployable protrusions are retracted inside said rolling wheel; and wherein said stair climbing wheel has a climbing configuration for use on stairs wherein a number of said plurality of deployable protrusions extend beyond the outer diameter of said rolling wheel.

2. A hand truck comprising a cargo ledge for transporting objects, a handle for pushing or pulling the hand truck, further comprising a shock absorber, and one or more of the stair climbing wheels of claim 1.

* * * * *